US008285878B2

(12) United States Patent
Gladwin et al.

(10) Patent No.: US 8,285,878 B2
(45) Date of Patent: Oct. 9, 2012

(54) BLOCK BASED ACCESS TO A DISPERSED DATA STORAGE NETWORK

(75) Inventors: S. Christopher Gladwin, Chicago, IL (US); Greg Dhuse, Chicago, IL (US); Vance Thornton, Chicago, IL (US); Manish Motwani, Chicago, IL (US); Jason Resch, Chicago, IL (US); Ilya Volvovski, Chicago, IL (US); Jamie Bellanca, Chicago, IL (US); John Quigley, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 909 days.

(21) Appl. No.: 11/973,613

(22) Filed: Oct. 9, 2007

(65) Prior Publication Data

US 2010/0023524 A1 Jan. 28, 2010

(51) Int. Cl.
*G06F 15/16* (2006.01)
*G06F 12/00* (2006.01)
(52) U.S. Cl. ........ 709/246; 709/203; 709/211; 709/217; 709/236; 709/245; 711/100
(58) Field of Classification Search .................. 709/203, 709/211, 217, 236, 245, 246
See application file for complete search history.

(56) References Cited

U.S. PATENT DOCUMENTS

| 4,092,732 | A | | 5/1978 | Ouchi |
| 5,485,474 | A | * | 1/1996 | Rabin ........................... 714/762 |
| 5,774,643 | A | | 6/1998 | Lubbers et al. |
| 5,802,364 | A | | 9/1998 | Senator et al. |
| 5,809,285 | A | | 9/1998 | Hilland |
| 5,890,156 | A | | 3/1999 | Rekieta et al. |
| 5,987,622 | A | | 11/1999 | Lo Verso et al. |
| 5,991,414 | A | | 11/1999 | Garay et al. |
| 6,012,159 | A | | 1/2000 | Fischer et al. |
| 6,058,454 | A | | 5/2000 | Gerlach et al. |
| 6,128,277 | A | | 10/2000 | Bruck et al. |
| 6,175,571 | B1 | | 1/2001 | Haddock et al. |
| 6,192,472 | B1 | | 2/2001 | Garay et al. |
| 6,256,688 | B1 | | 7/2001 | Suetaka et al. |
| 6,272,658 | B1 | | 8/2001 | Steele et al. |
| 6,366,995 | B1 | | 4/2002 | Vilkov et al. |
| 6,374,336 | B1 | | 4/2002 | Peters et al. |
| 6,415,373 | B1 | | 7/2002 | Peters et al. |
| 6,418,539 | B1 | | 7/2002 | Walker |

(Continued)

FOREIGN PATENT DOCUMENTS

WO 2007103533 A1 9/2007

OTHER PUBLICATIONS

Chung, "An Automatic Data Segmentation Method for 3D Measured Data Points," National Taiwan University, 1998, pp. 1-8.

(Continued)

*Primary Examiner* — Emmanuel L Moise
*Assistant Examiner* — Vitali Korobov
(74) *Attorney, Agent, or Firm* — Garlick & Markison; Timothy W. Markison (57) ABSTRACT

A block-based interface to a dispersed data storage network is disclosed. The disclosed interface accepts read and write commands from a file system resident on a user's computer and generates network commands that are forwarded to slice servers that form the storage component of the dispersed data storage network. The slice servers then fulfill the read and write commands.

10 Claims, 8 Drawing Sheets

U.S. PATENT DOCUMENTS

| | | |
|---|---|---|
| 6,449,688 B1 | 9/2002 | Peters et al. |
| 6,567,948 B2 | 5/2003 | Steele et al. |
| 6,609,223 B1 | 8/2003 | Wolfgang |
| 6,760,808 B2 | 7/2004 | Peters et al. |
| 6,785,768 B2 | 8/2004 | Peters et al. |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,609 B2 | 4/2006 | Wolfgang et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,461 B1 | 12/2006 | Kiselev et al. |
| 7,146,644 B2 | 12/2006 | Redlich et al. |
| 7,171,493 B2 | 1/2007 | Shu et al. |
| 7,240,236 B2 | 7/2007 | Cutts et al. |
| 7,272,613 B2 | 9/2007 | Sim et al. |
| 2002/0166079 A1 | 11/2002 | Ulrich et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0228493 A1* | 11/2004 | Ma ............... 380/286 |
| 2005/0114594 A1 | 5/2005 | Corbett et al. |
| 2005/0125593 A1 | 6/2005 | Karpoff et al. |
| 2005/0144382 A1 | 6/2005 | Schmisseur |
| 2005/0144514 A1 | 6/2005 | Ulrich et al. |
| 2006/0047907 A1 | 3/2006 | Shiga et al. |
| 2006/0136448 A1 | 6/2006 | Cialini et al. |
| 2006/0269148 A1* | 11/2006 | Farber et al. ............ 382/232 |
| 2007/0079081 A1 | 4/2007 | Gladwin et al. |
| 2007/0079082 A1* | 4/2007 | Gladwin et al. ......... 711/154 |
| 2007/0079083 A1 | 4/2007 | Gladwin et al. |
| 2007/0143359 A1 | 6/2007 | Uppala |
| 2007/0174192 A1 | 7/2007 | Gladwin et al. |
| 2007/0214285 A1* | 9/2007 | Au et al. ............... 709/246 |
| 2008/0043750 A1* | 2/2008 | Keels et al. ........... 370/395.52 |
| 2008/0273693 A1* | 11/2008 | Au et al. ............... 380/28 |
| 2009/0254572 A1* | 10/2009 | Redlich et al. ......... 707/10 |

OTHER PUBLICATIONS

Copenheaver, International Search Report and Written Opinion of the International Searching Authority for PCT/US 2008/77174, Dec. 5, 2008.

Shamir, "How to Share a Secret" Communications of the ACM, vol. 22, No. 11, Nov. 1979.

Rabin, "Efficient Dispersal of Information for Security, Load Balancing, and Fault Tolerance" Journal of the Association for Computer Machinery, vol. 36, No. 2, Apr. 1989.

International Search Report and Written Opinion, International Application No. PCT/US2009/050198, mailed Oct. 28, 2009.

Extended European Search Report for Application No. 08837609.0 dated Jul. 12, 2012; 8 pgs.

* cited by examiner

BLOCK BASED ACCESS TO A DISPERSED DATA STORAGE NETWORK

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for block based access to a dispersed data storage network.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Files are usually organized in file systems, which are software components usually associated with an operating system. Typically, a file system provides means for creating, updating, maintaining, and hierarchically organizing digital data. A file system accepts digital data of arbitrary size, segments the digital data into fixed-size blocks, and maintains a record of precisely where on the physical media data is stored and what file the data is associated with. In addition, file systems provide hierarchical directory structures to better organize numerous files.

Various interfaces to storage devices are also well known in the art. For example, Small Computer System Interface ("SCSI") is a well known family of interfaces for connecting and transferring data between computers and peripherals, including storage. There are also a number of standards for transferring data between computers and storage area networks ("SAN"). For example, Fibre Channel is a networking technology that is primarily used to implement SANs. Fibre Channel SANS can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference.

In 1979, two researchers independently developed a method for splitting data among multiple recipients called "secret sharing." One of the characteristics of secret sharing is that a piece of data may be split among n recipients, but cannot be known unless at least t recipients share their data, where $n \geq t$. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSNs"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where $n > m$.

However, prior art dispersed data storage networks have had limited application. In particular, the prior art dispersed data storage networks have not been generally accessible by commonly used operating systems. Rather, dispersed data storage networks have been used to accomplish specific tasks, such as securing extremely sensitive information, or for experimental purposes. Nonetheless, a generally accessible dispersed data storage network would offer significant utility to a wide variety of users. For example, a dispersed data storage network could be interfaced to servers implementing an online store and used to warehouse customer information, like credit card numbers. This would allow the online store the advantages of a dispersed data network without having to implement a special interface to the dispersed data network. Other uses of a block-based interface to a dispersed data storage network are apparent to a person of ordinary skill in the art.

OBJECTS OF THE INVENTION

Accordingly, it is an object of this invention to provide a system, apparatus, and method for creating and operating a widely accessible dispersed data storage network.

Another object of this invention is to enable dispersed data storage networks to integrate with commonly used operating systems, and to use commonly available file systems, such as NTFS, HFS+, and ext3.

Another object of this invention is to provide an improved method of writing data to dispersed data storage network.

Another object of this invention is to provide an improved method of reading data from a dispersed data storage network.

SUMMARY OF THE INVENTION

The disclosed invention achieves its objectives by providing a block-based interface to a dispersed data storage network. A block-based interface can be provided through means such as a customized iSCSI Target, or through a device driver written for a specific operating system. By providing a block-based interface, a dispersed data storage network can be mounted onto a computer system as an ordinary drive. The user of the computer can then interact with the dispersed data storage network as if it were an ordinary drive, i.e., files can be copied to the dispersed data storage network by dragging them to the appropriate drive icon. In addition, a user of the dispersed data storage network can use file systems provided by the operating system of the user's computer, such as NTFS, HFS+ and ext3.

In one aspect of the disclosed invention, a method of reading data from a dispersed data storage network is disclosed. A fixed-size block of data is requested from an interface operating on a user's computer. In response to the requested block of data, a list of slice servers holding data slices associated with the requested block is assembled. The data slices associated with the requested block are then read from the slice servers on the assembled list until enough data slices have been read to reconstruct the requested data block. The requested data block is then assembled and provided to a requesting application through an interface on the user's computer.

As part of the process of reading a block of data from the dispersed data storage network, data slices may be decrypted or decompressed. In addition, a checksum may be computed for each received data slice and compared to a CRC or other form of checksum appended to the data slice to ensure the integrity of the received data slice. Similar procedures may be performed on each assembled block.

In another aspect of the disclosed invention, a method of writing data to a dispersed data storage network is disclosed. A fixed-size block of data is accepted by an interface on a user's computer. The block is then segmented into a predetermined number of data slices, each of which is then transmitted to a separate slice server for storage.

As part of the process of writing a block of data to the dispersed data storage network, the data block may be encrypted or compressed. In addition, a checksum may be computed and appended to each block, so that the integrity of each block may be verified when read from the dispersed data storage network. Similar procedures may be formed for each written data slice.

In yet another aspect of the disclosed invention, a distributed computer system implementing a dispersed data storage network is disclosed. The system includes an operating system with one or more file system components, such as NTFS, FAT32, HFS+, or ext3. The file system will expose interfaces to application programs allowing digital files to be read and written. The system also includes a data dispersal/assembly software component, which interacts with the file system and slice servers resident on dispersed data storage network via a network layer.

The disclosed distributed computer system could implement a block-based interface to the dispersed data storage network via an iSCSI Target. Alternatively, the block-based interface could be implemented as a device driver.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
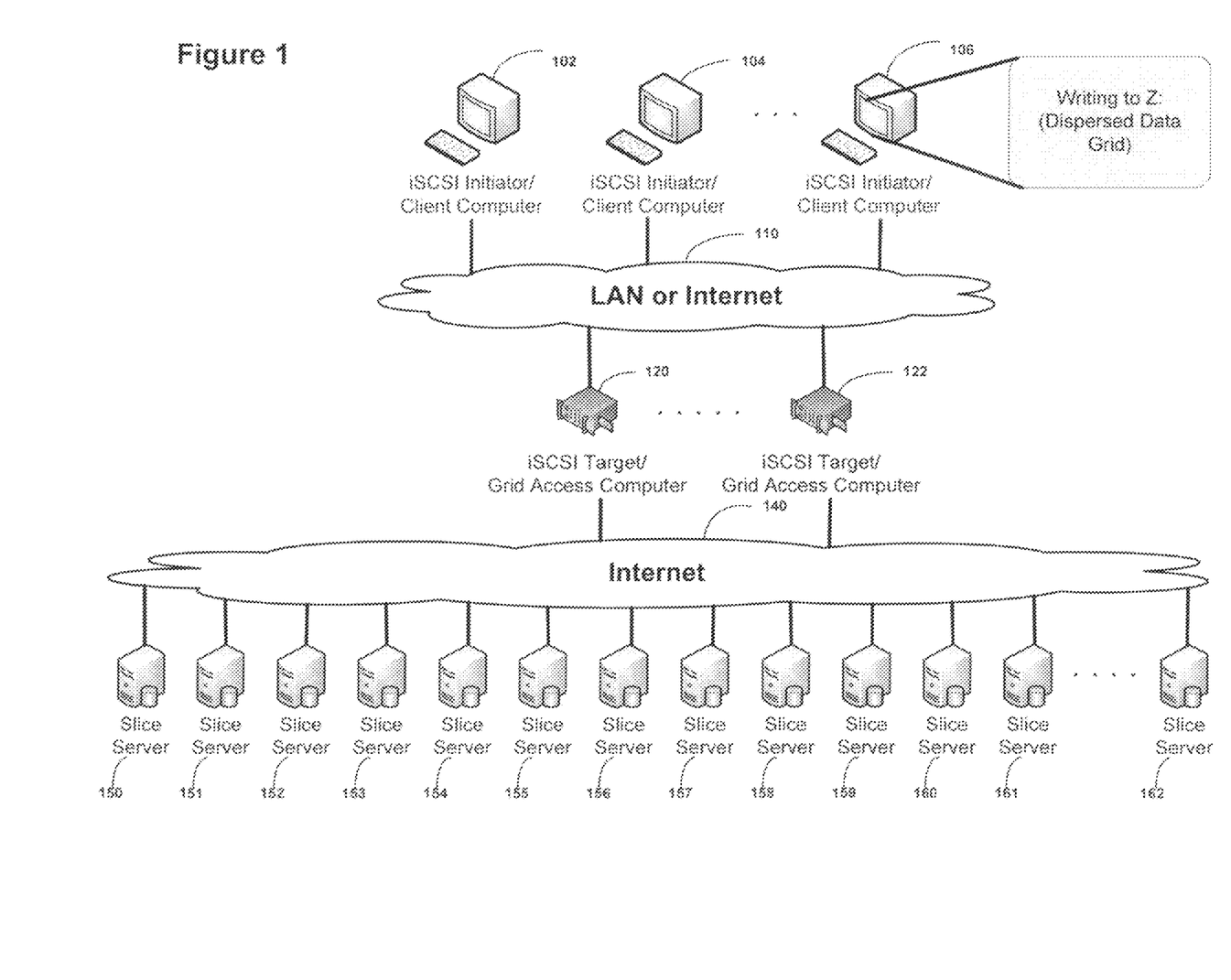
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked source computers 102, 104, 106. As illustrated, some number of grid access computers 120, 122 serve as networked iSCSI Targets for an arbitrary number of source computers 102, 104, 106, which are configured as iSCSI Initiators.

As explained herein, the disclosed invention allows a dispersed data storage network to be presented as a block device which can be mounted as a network drive by compatible operating systems. As illustrated, the dispersed data storage network is accessed by the source computers 102, 104, 106, as an iSCSI Target. In particular, each source computer 102, 104, 106 writes data blocks to an iSCSI Initiator, which forms network commands that are directed to an associated iSCSI Target, which is in this case implemented on grid access computers 120, 122. Note that an iSCSI Target could be implemented on the source computers 102, 104, 106, which would make the grid access computers 120, 122 unnecessary. In addition, a different storage protocol, such as FCP or ATA over Ethernet could be used, or a device driver could be implemented directly on the source computers 102, 104, 106 to present the dispersed data storage network as a mounted drive. The iSCSI implementation discussed herein is only used as a device to aid the understanding of the disclosed invention by a person of ordinary skill in the art.

Figure 2:
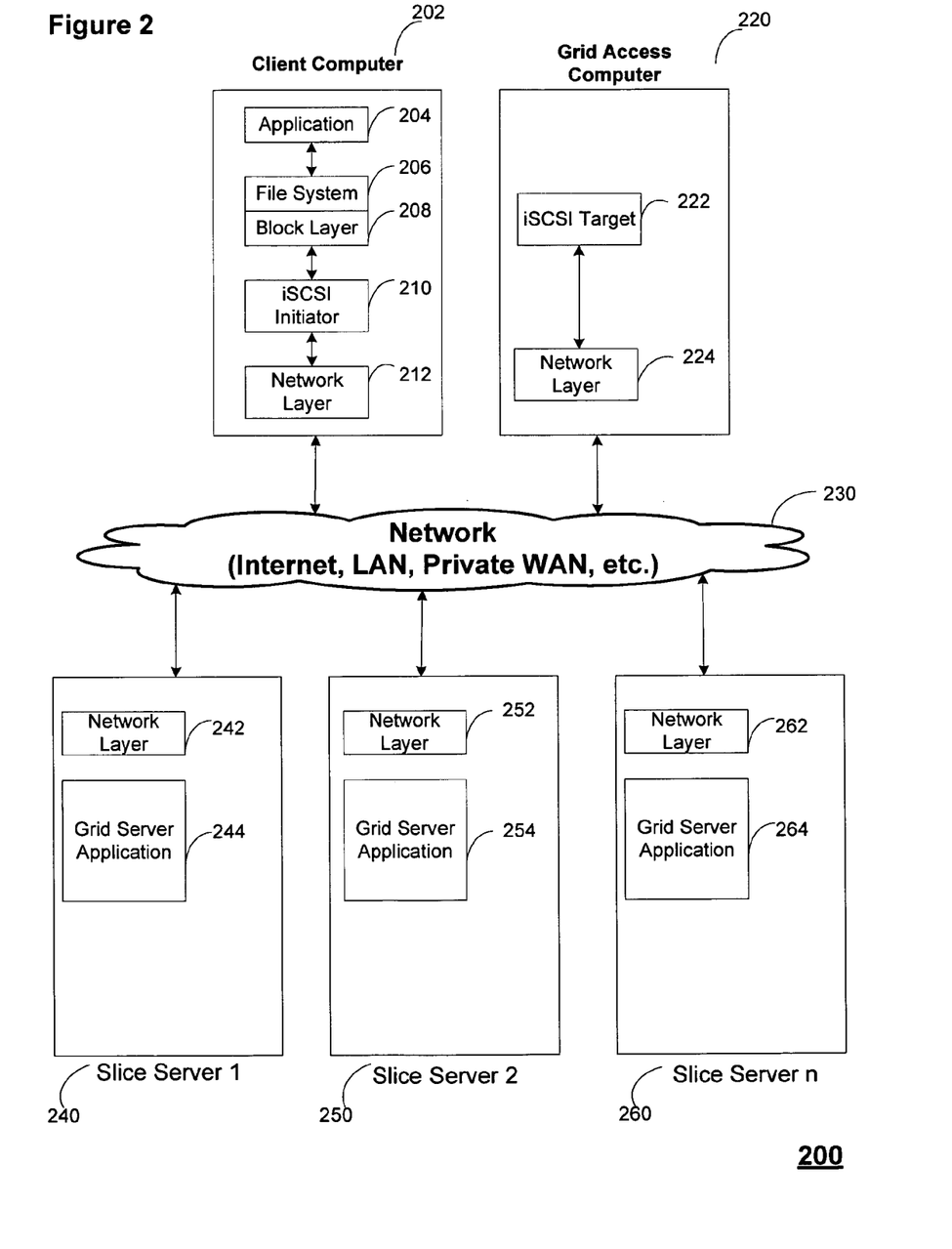
FIG. 2 is a block diagram illustrating the interoperation of different software components used to implement a dispersed data storage network constructed in accordance with an embodiment of the disclosed invention.

FIG. 2 illustrates a distributed computer system implementing a dispersed data storage network 200. The illustrated system consists of a client/user computer 202, a grid access computer 220, and some number of slice servers 240, 250, 260. Within the client computer 202 an application program 204 accesses an operating system including a file system 206. The operating system may include a separate block layer 208, meaning an interface to block devices such as storage device drivers, or the functionality of the block layer 208 may be incorporated into the file system 206. In either case, read and write commands directed to the file system are forwarded to an iSCSI Initiator 210, which formulates network commands that are carried out by a network layer 212, which is also part of the operating system operating on the client computer 202.

As illustrated, the iSCSI Initiator 210 operating on the client computer 202 is configured to operate with iSCSI Target 222, resident on grid access computer 220. The iSCSI Target 222 receives network commands from the iSCSI Initiator 210 via a separate network layer 224 operating on the grid access computer 220. As opposed to a standard iSCSI Target, which would merely store data on one or more drives accessible to the iSCSI Target, the iSCSI Target 222 operating on the grid access computer 220 is configured to operate with a dispersed data storage network. As will be explained in more detail in the sections that follow, the iSCSI Target 222 implements a data dispersal algorithm in accordance with the commands received from the iSCSI Initiator 210, and either retrieves data from appropriate slice servers 240, 250, 260 or writes data to the same. Each slice server 240, 250, 260 also contains a grid server application 244, 254, 264 that stores and retrieves data slices in accordance with network commands received from the grid access computer 220 via the network layers 242, 252, 262 of the respective slice servers 240, 250, 260.

Figure 3:
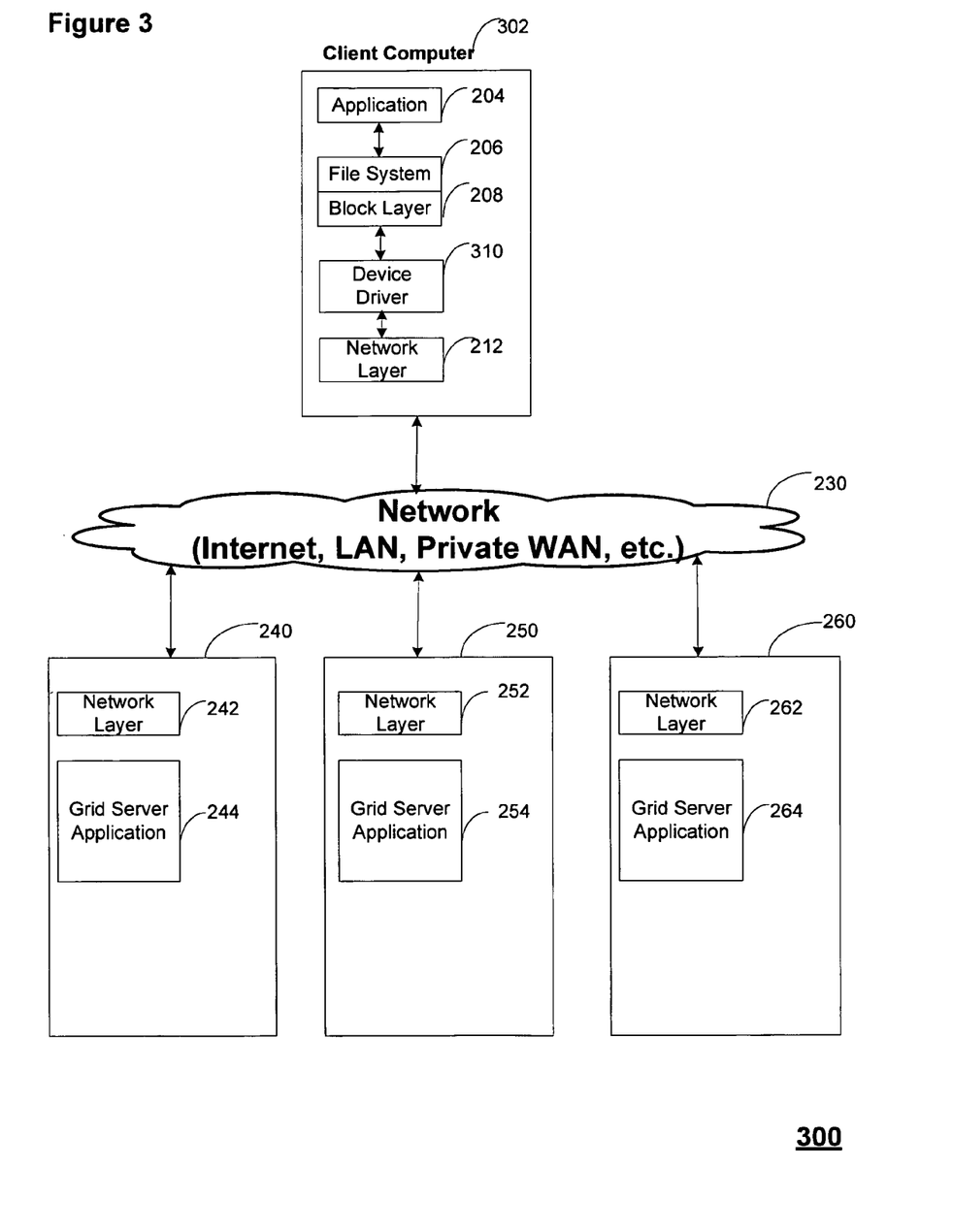
FIG. 3 is a block diagram illustrating the interoperation of different software components used to implement a dispersed data storage network constructed in accordance with a different embodiment of the disclosed invention.

FIG. 3 illustrates a slightly different distributed computer system implementing a dispersed data storage network 300. The illustrated system is identical to that shown in FIG. 2, except that the grid access computer 220 has been entirely removed, and, instead of using an iSCSI Target 222 to implement a block interface to the dispersed data storage network, a device driver 310 resident on the client user computer 302 implements the block interface. In this implementation, the device driver 310 receives read and write commands from the file system 206. The device driver 310 is configured to fulfill read and write commands through the dispersed data storage network 240, 250, 260. Like the iSCSI Target 222 of the previously discussed implementation, the device driver 310 implements a data dispersal algorithm in accordance with the commands received from the file system 206, and either retrieves data from appropriate slice servers 240, 250, 260 or writes data to the same. The embodiment of FIG. 3 is otherwise similar to that of FIG. 2.

Figure 4A:
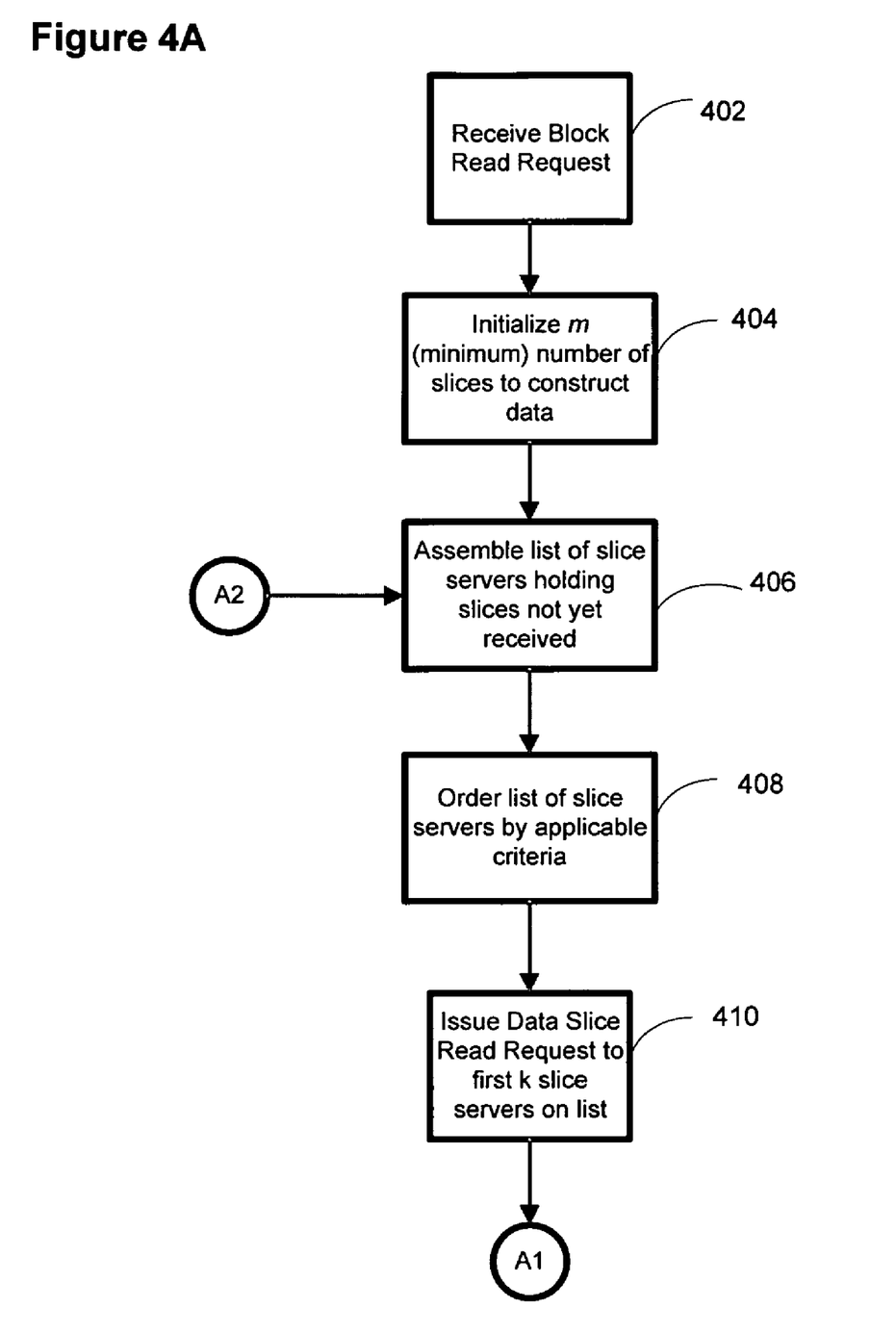
FIGS. 4A-4C collectively illustrates a read operation from a dispersed data storage network constructed in accordance with an embodiment of the disclosed invention.
Figure 4B:
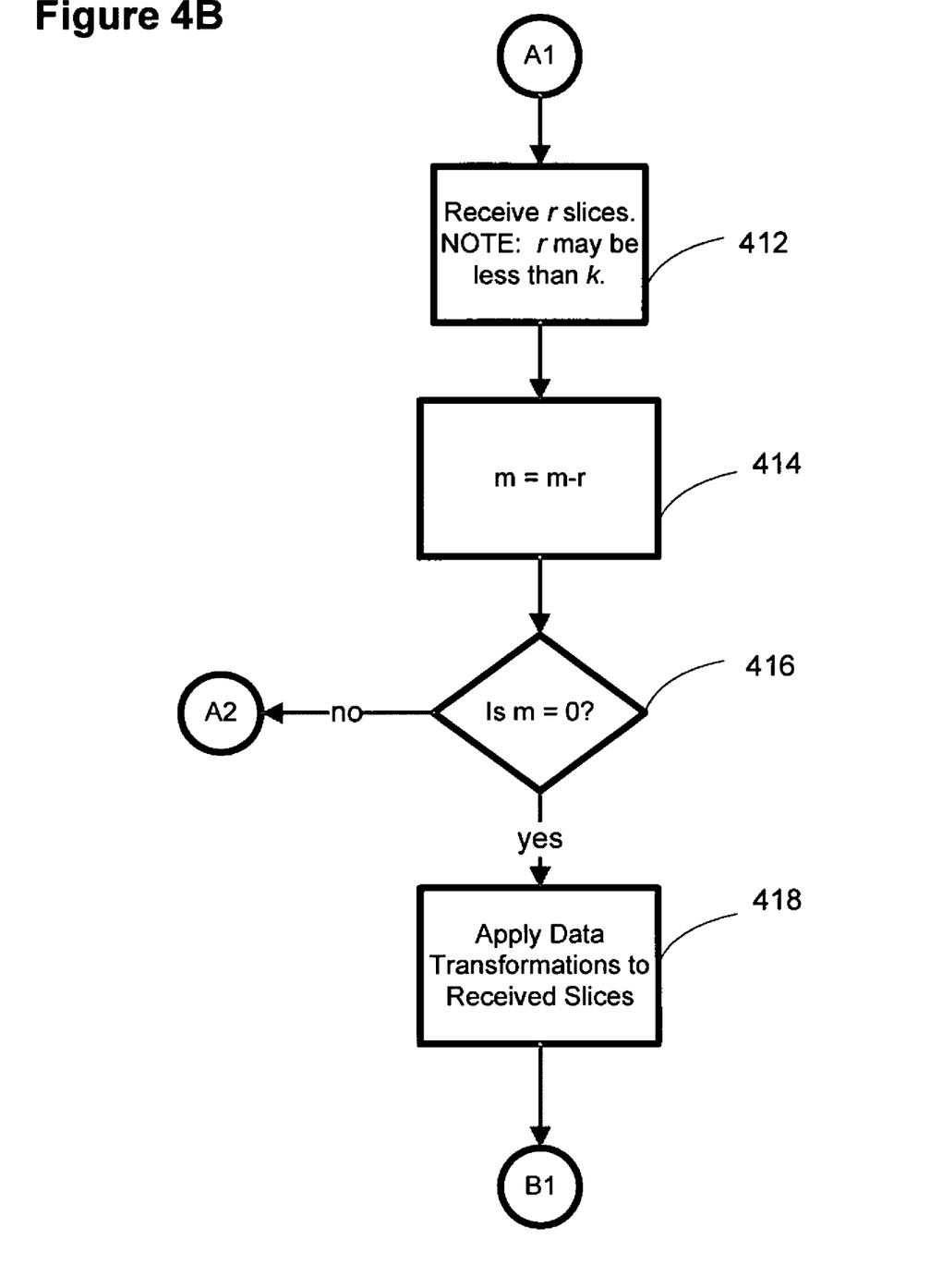
Figure 4C:
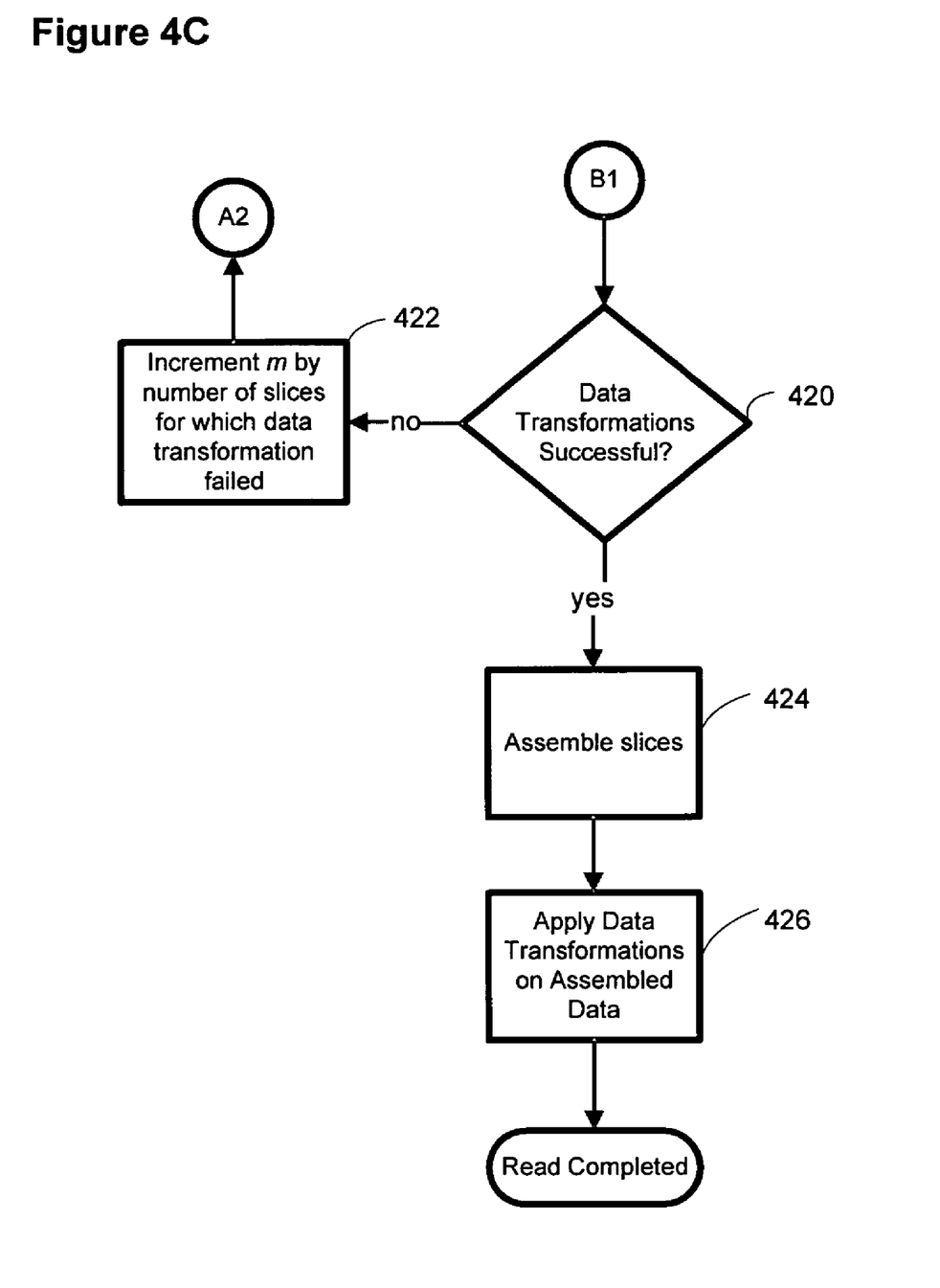

FIGS. 4A-4C show the process by which an iSCSI Target, or other data dispersal/assembly software component, constructed in accordance with the disclosed invention could handle a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in United States Patent Application titled "VIRTUALIZED DATA STORAGE VAULTS ON A DISPERSED DATA STORAGE NETWORK," filed on Oct. 9, 2007, having a serial number of 11/973,621, and assigned to Cleversafe, Inc. In step 404, the variable m is initialized to the minimum number of slices required to construct the requested data. As described herein, for each successfully received and validated slice, m is decremented.

In step 406, a list of slice servers each holding one required data slice that has yet to be received is assembled, and in step 408, the list is ordered by any applicable criteria. Further information on criteria by which the list may be ordered is contained in United States Patent Application titled "SMART ACCESS TO A DISPERSED DATA STORAGE NETWORK," filed on Oct. 9, 2007, having a serial number of 11/973,622, and assigned to Cleversafe, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. Note that the number of received data slices r may be smaller than the number of requested data slices k. In step 416, m is compared to zero, and if m is not equal to zero, execution returns to step 406, and execution proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice may be been corrupted. However, if the applied data transformations were successful for all received data slices, the received slices are assembled into the requested block of data in step 424. The same or different data transformations may optionally be applied to the assembled data block in step 426, which completes the read process.

Figure 5A:
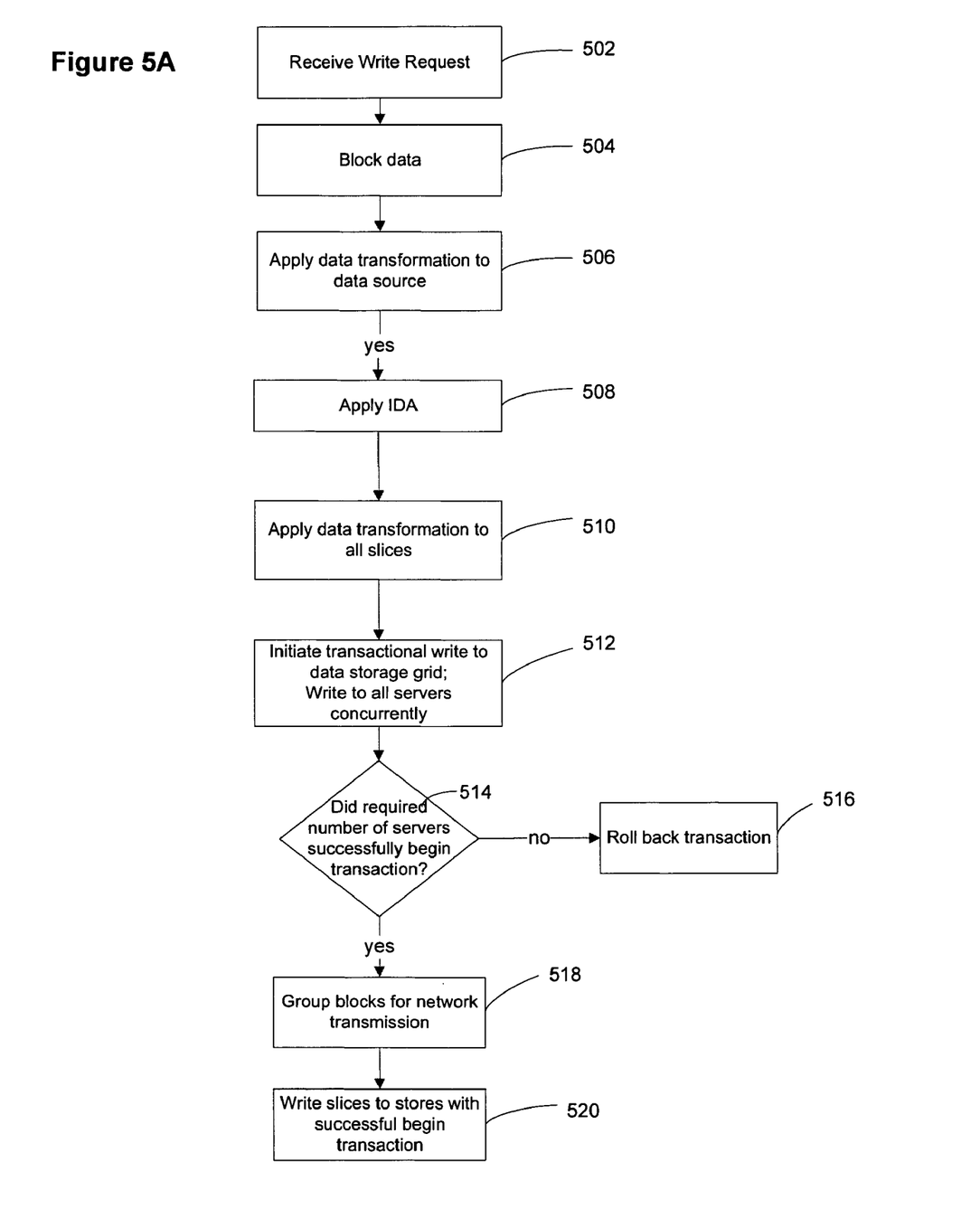
FIGS. 5A-5B collectively illustrates a write operation from a dispersed data storage network constructed in accordance with an embodiment of the disclosed invention.
Figure 5B:
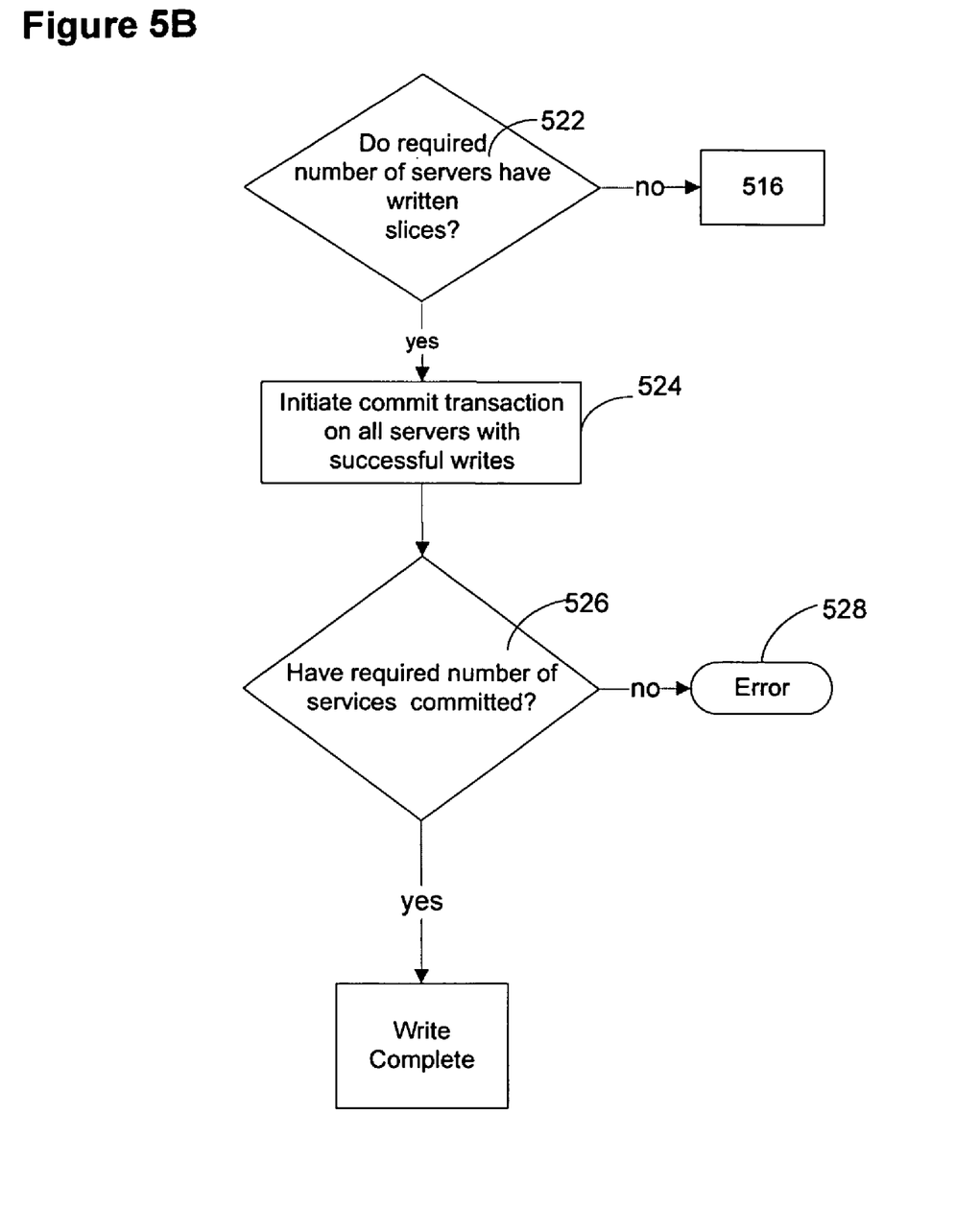

In FIGS. 5A-5B, the process by which an iSCSI Target, or other data dispersal/assembly software component, constructed in accordance with the disclosed invention could handle a write request is illustrated. In step 502 a write request is received. Included in this write request is a data segment to be written that could span many fixed length blocks. In addition, the write request will contain information sufficient to determine which slice servers the data segment should be written to, as well as information required by the information dispersal algorithm to slice each block, i.e., the number of slices to be written, referred to as n, as well as the minimum number of slices that are required to recover the data, referred to as m. Further information on one method that can be used to associate data writes with particular slice servers is contained in United States Patent Application titled "VIRTUALIZED DATA STORAGE VAULTS ON A DISPERSED DATA STORAGE NETWORK," filed on Oct. 9, 2007, having a serial number of 11/973,621, and assigned to Cleversafe, Inc.

In step 504, the data segment is blocked into identical length fixed-size blocks. A number of data transformations may optionally be applied to each block in step 506, and an information dispersal algorithm is applied in step 508. In particular, the Cauchy Reed-Solomon dispersal algorithm could be applied to each block, resulting in a predetermined number of data slices. In step 510, a number of data transformations are optionally applied to each data slice.

In the disclosed system, writes are performed transactionally, meaning that all data slices must be successfully written before a write is deemed complete. In step 512, a write transaction is initiated to the data storage network. As discussed herein, all slice servers are simultaneously contacted, and in step 514, a confirmation that at least n receiving slice servers are prepared to begin the write transaction must be received, or the transaction is rolled back in step 516.

In step 518 blocks are grouped for transmission, and in step 520 data slices are transmitted to the slice servers that indicated their ability to receive and store slices. The number of slice servers that successfully received and stored their assigned data slices is checked in step 522, and if less than n slices are successfully stored, the transaction is rolled back in step 516. In step 524, a commit transaction is begun on all servers with successful writes. If the commit transaction fails, an error is logged in step 528.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of reading data from a dispersed data network, said method operating on at least one computer and comprising the steps of:
    identifying a data segment that includes a plurality of blocks of data, wherein the plurality of blocks of data is encoded using an information dispersal algorithm to produce a plurality of "n" number of data slices, wherein one of the plurality of blocks of data is encoded into one of the plurality of "n" number of data slices, and wherein data slices of the plurality of "n" number of data slices are grouped to produce "n" number of data slice groups which is stored in the dispersed data network, and wherein the data segment is divided into the plurality of blocks of data in accordance with the block-based file system;
    assembling a list of slice servers, wherein each slice server on said list stores one of the "n" number of data slice groups;
    issuing read requests for at least "m" number of data slice groups to at least "m" number of the slice servers of the list of slice servers, wherein "m" is less than "n" and represents a minimum number of data slices to recover the one of the plurality of blocks of data from the one of the plurality of "n" number of data slices;
    when at least "m" number of data slice groups have been received from the at least "m" number of slice servers:
    decoding the at least "m" number of data slice groups in accordance with the information dispersal algorithm to reproduce the plurality of blocks of data; and
    reconstructing the data segment from the reproduced plurality of blocks of data.

2. The method of claim 1, wherein said one of the plurality of blocks of data is encrypted and further comprising the step of decrypting said one of the plurality of blocks of data.

3. The method of claim 1, further comprising the steps of calculating a first checksum for said one of the plurality of blocks of data, and comparing said first checksum to a second checksum appended to said one of the plurality of blocks of data.

4. The method of claim 1, further comprising the steps of calculating a first checksum for a received data slice, and comparing said first checksum to a second checksum appended to said received data slice.

5. The method of claim 1, wherein the block-based file system comprises at least one of:
    an iSCSI protocol;
    an FCP protocol; and
    an ATA protocol.

6. A computer comprising:
    a network interface for interfacing with a dispersed data storage network; and
    a software component operable to:
    receive a request for a data segment that includes a plurality of blocks of data, wherein the plurality of blocks of data is encoded using an information dispersal algorithm to produce a plurality of "n" number of data slices, wherein one of the plurality of blocks of data is encoded into one of the plurality of "n" number of data slices, and wherein data slices of the plurality of "n" number of data slices are grouped to produce "n" number of data slice groups which is stored in the dispersed data network and wherein the data segment is divided into the plurality of blocks of data in accordance with the block-based file system;
    assemble a list of slice servers, wherein each slice server on said list stores one of the "n" number of data slice groups;
    issue, via the network interface, read requests for at least "m" number of data slice groups to at least "m" number of the slice servers of the list of slice servers, wherein "m" is less than "n" and represents a minimum number of data slices to recover the one of the plurality of blocks of data from the one of the plurality of "n" number of data slices;
    when at least "m" number of data slice groups have been received from the at least "m" number of slice servers:
    decode the at least "m" number of data slice groups in accordance with the information dispersal algorithm to reproduce the plurality of blocks of data; and
    reconstruct the data segment from the reproduced plurality of blocks of data.

7. The computer of claim 6, wherein said software component is implemented as an iSCSI target.

8. The computer of claim 7, wherein the decoding the at least "m" number of data slice groups further comprises at least one of:

applying a first data transformation on data slices of the at least "m" number of data slices groups to produce a plurality of at least "m" number of data slices;

applying the information dispersal algorithm on the plurality of at least "m" number of data slices to produce recovered plurality of data blocks; and applying a second data transformation on the recovered plurality of data blocks to produce the reproduced plurality of blocks of data.

9. The computer of claim 6, wherein said software component is implemented as a device driver.

10. The computer of claim 9, wherein the block-based file system comprises at least one of:

an iSCSI protocol;
an FCP protocol; and
an ATA protocol.

* * * * *